US009505565B2

(12) United States Patent
Pedersen

(10) Patent No.: US 9,505,565 B2
(45) Date of Patent: Nov. 29, 2016

(54) POWDER MATERIAL INTAKE DEVICE AND METHOD FOR TAKING POWDER MATERIAL INTO A LIQUID

(75) Inventor: Bent Pedersen, Hojbjerg (DK)

(73) Assignee: SPX ADV DENMARK A/S, Silkeborg (DK)

( * ) Notice: Subject to any disclaimer, the term of this patent is extended or adjusted under 35 U.S.C. 154(b) by 247 days.

(21) Appl. No.: 13/322,689

(22) PCT Filed: May 28, 2010

(86) PCT No.: PCT/EP2010/003278
§ 371 (c)(1),
(2), (4) Date: Jun. 1, 2012

(87) PCT Pub. No.: WO2010/136216
PCT Pub. Date: Dec. 2, 2010

(65) Prior Publication Data
US 2012/0279572 A1   Nov. 8, 2012

(30) Foreign Application Priority Data

May 28, 2009   (EP) ...................................  09007155

(51) Int. Cl.
*F17D 1/00*   (2006.01)
*B65G 53/16*   (2006.01)
(Continued)

(52) U.S. Cl.
CPC ............. *B65G 53/16* (2013.01); *A23L 1/0085* (2013.01); *A23L 2/39* (2013.01); *B01F 1/0022* (2013.01);
(Continued)

(58) Field of Classification Search
CPC ...... B65G 51/02; B65G 53/28; B65G 53/16; B05B 7/1404
USPC ........ 137/237, 240, 268, 605, 606; 406/127, 406/128
See application file for complete search history.

(56) References Cited

U.S. PATENT DOCUMENTS

| 3,790,036 | A | * | 2/1974 | Miller ........................... 406/128 |
| 4,687,381 | A | * | 8/1987 | Dumain et al. ................. 406/52 |
| 5,160,222 | A | * | 11/1992 | Noland ......................... 406/124 |
| 6,283,680 | B1 | * | 9/2001 | Vidal ............................ 406/128 |

(Continued)

FOREIGN PATENT DOCUMENTS

| CN | 101391709 A1 | 3/2009 |
| EP | 0526808 A1 | 2/1993 |
| GB | 1167148 | 10/1969 |

OTHER PUBLICATIONS

Third Office Action for corresponding Chinese Application No. 201080031623.5, dated Jun. 3, 2014.

*Primary Examiner* — Mary McManmon
*Assistant Examiner* — Reinaldo Sanchez-Medina
(74) *Attorney, Agent, or Firm* — Baker and Hostetler LLP

(57) ABSTRACT

A device for taking powder material into liquid including an inlet to which fluidized powder is supplied with a first pressure, an outlet into a liquid tank having a second pressure less than the first pressure, a powder material intake from the inlet to the outlet, a valve for the powder material intake, and a gaseous medium intake with an outlet into the powder intake with a pressure higher than the second pressure, wherein the outlet of the gaseous medium intake is in the powder material intake downstream from the valve. A method including: applying a vacuum or low pressure to the liquid, passing powder material into the liquid through a powder material intake, providing a valve in the powder material intake, and supplying a pressurized gaseous medium into the powder material intake downstream the valve at least partially during closing and/or opening the valve.

19 Claims, 2 Drawing Sheets

(51) Int. Cl.
*A23L 1/00* (2006.01)
*A23L 2/39* (2006.01)
*B01F 1/00* (2006.01)
*B01F 15/02* (2006.01)
*B65G 53/28* (2006.01)

(52) U.S. Cl.
CPC ....... *B01F 15/0202* (2013.01); *B01F 15/0258* (2013.01); *B65G 53/28* (2013.01); *Y10T 137/0318* (2015.04); *Y10T 137/4891* (2015.04)

(56) References Cited

U.S. PATENT DOCUMENTS

| | | | |
|---|---|---|---|
| 6,319,995 B2 * | 11/2001 | Glenn et al. | 526/64 |
| 7,651,010 B2 * | 1/2010 | Orzech et al. | 222/214 |
| 8,430,112 B2 * | 4/2013 | Matheis et al. | 137/15.05 |
| 2004/0134930 A1 | 7/2004 | Hiraki et al. | |
| 2006/0003065 A1 * | 1/2006 | Kateman | A23G 9/20 426/506 |

* cited by examiner

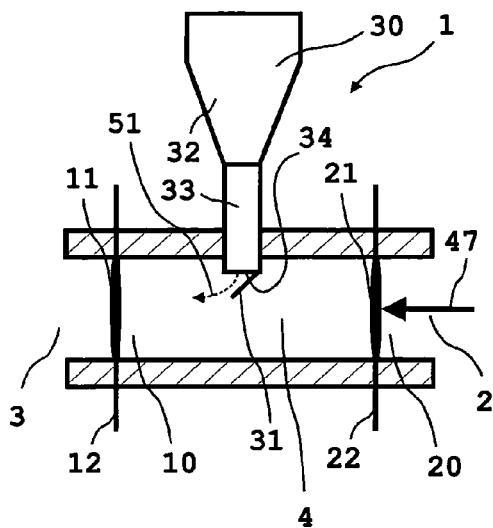
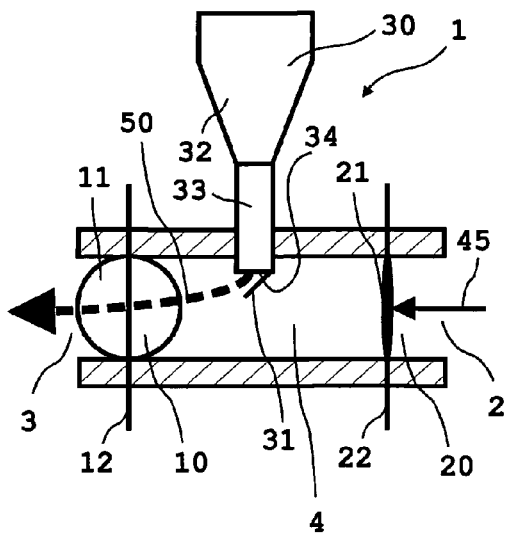
Fig. 5  Fig. 6
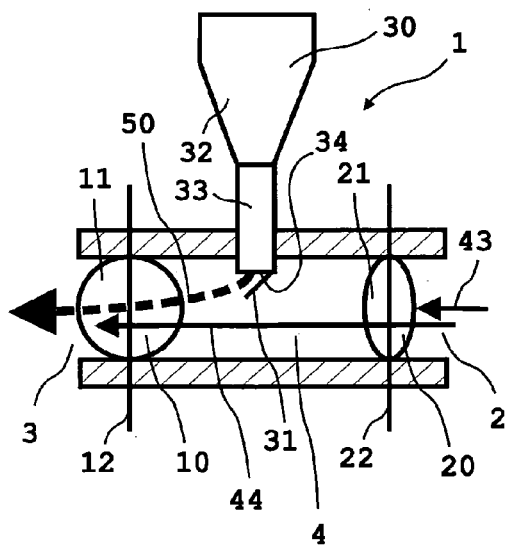
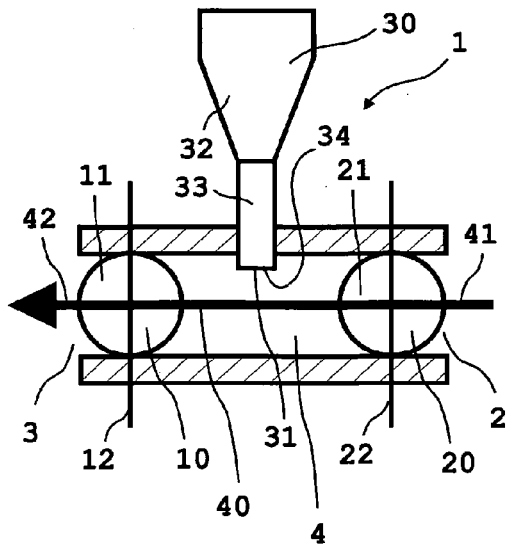
Fig. 7  Fig. 8

POWDER MATERIAL INTAKE DEVICE AND METHOD FOR TAKING POWDER MATERIAL INTO A LIQUID

CROSS-REFERENCE TO RELATED APPLICATIONS

This application is a National Stage of International patent application PCT/EP2010/003278, filed on May 28, 2010, which claims priority to foreign European Patent Application No. EP 09007155.6, filed on May 28, 2009, the disclosures of each of which are incorporated by reference in their entireties.

FIELD OF THE DISCLOSED SUBJECT MATTER

The present invention relates to a powder material intake device for taking a powder material into a liquid and a method for taking powder material into a liquid.

BACKGROUND

In the context of this application the term "gaseous medium" is to be understood that it covers "air" or any other gaseous medium, preferably a gaseous medium which is suitable to be used in the food industry, such as nitrogen, carbon dioxide and/or atmospheric air.

In the context of this application the term "powder material" is to be understood that it covers "powder" or any other powder material, preferably a powder material which is suitable to be used in the food industry, such as carbohydrates, proteins, stabilizers and/or emulsifiers.

Powder material intake devices and methods for taking powder material into a liquid are used for instance in the food and beverage industry in order to intake powder products into a liquid being in a process tank, especially wherein a discontinuous supply of powder material into the liquid is desired. In the process tank there is provided a low pressure or vacuum above the liquid such that a mixture of powder material and gas/air is sucked into the liquid. In some known devices the powder material is also pressurized before the powder material is supplied to the powder material intake device. These known powder material intake devices comprise a valve for opening and closing the passage through which the powder/gas mixture is sucked into the liquid in the process tank. Normally the known powder material intake devices are equipped with a single-seat valve. The single-seat valve of the powder material intake device has a wet side, i.e. the valve seat part facing the outlet of the powder material intake device (or the liquid in the process tank), and a dry side, i.e. the valve seat part facing the inlet of the powder material intake device (or the powder reservoir).

The known powder material intake devices suffer from a limited life time of the seal of the valve because there is a problem with wet powder material sticking on the seal especially when the valve is opened or closed.

When the valves opens, the low pressure or vacuum above the liquid in the process tank will create a flow of a powder gas mixture into the liquid. It is crucial that the pressure of the powder gas mixture is higher than the pressure in the process tank. Therefore a specific mass flow of the powder gas mixture will be necessary to ensure that the pressure at the dry side of the valve seat is higher than the pressure in the pressure tank. If the pressure of the powder gas mixture becomes too low, i.e. lower than the pressure in the process tank, then a backflow of wet powder or even liquid from the process tank to the valve can take place and wet also the dry side of the valve. Especially if the powder material has a high density, the powder material will queue up in front of the closed valve at the dry side thereof before opening the valve. In such cases a certain time will lapse for accelerating the powder gas mixture such that a flow of the powder gas mixture is build up which can prevent the liquid or wet powder to contact the dry side of the valve seat of the single seat valve. During the time before a sufficient flow of the powder gas mixture can be established, some backflow will take place and sometimes wet the dry side of the valve seat. These wetted areas including the valve seat and other seal areas will provide a basis for the powder to scale up and/or coat wetted areas.

When the valve closes the powder gas mixture will continue to flow between the valve seat and the closing member until the valve is fully closed and a contact between the valve seat and the closing member is reached. Therefore the powder gas mixture will be accelerated at the end of closing the valve wherein heat will be generated. This will result into abrasive wear of the seals of the valve. Furthermore the coating of the scaled up powder material on the seals and the valve seat will become very dry and hard due to the generated heat. This can finally result into a leakage through the valve.

Due to these problems the life time of the seals of the valves is sometimes only one day or a few days.

SUMMARY

Accordingly it is an object of the present invention to provide a powder material intake device for taking a powder material into a liquid having a longer operation life time and to provide a method for taking powder material into a liquid with extended operation periods.

The object of the invention is achieved by a powder material intake device in accordance with the features of claim 1 and a method in accordance with the features of claim 7, respectively. Preferred embodiments of the invention are disclosed in the dependent claims.

The embodiments of the invention have the advantage that it is ensured that the valves and especially the valve seat, the valve sealing and the valve closing member are kept dry and clean. This will ensure an extended lifetime of the valve seals and provide a reliable food manufacturing process (or other production process) with less number of failures caused by blocking powder material intake devices. Furthermore there is the advantage that the valve system can be dismantled for inspection and maintenance.

Embodiments with a second valve have the additional advantage that the process tank does not need to be emptied for maintenance and cleaning because the second valve can be kept closed. Preferably the powder intake passage can be spilt into two sections for maintenance and cleaning such that one section houses the first valve and the other section houses the second valve. The gaseous medium intake device outlet can be located in either the first section or the second section, but it is preferred to locate the gaseous medium intake device outlet in the first section such that the powder material intake device can be removed or dismounted almost completely from the process tank, i.e. without the second section and the second valve. The first and second sections of the powder material intake passage can be connectable on a manner known to the skilled person. For instance flange connection means and/or clamp connection means and/or hinge connection means can be provided.

In accordance with the invention there is provided a powder material intake device for taking powder material into liquid comprising
- an inlet to which fluidized powder is supplied with a first pressure;
- an outlet into a liquid tank having a second pressure less than the first pressure at the inlet;
- a powder material intake passage from the inlet to the outlet;
- a first valve for closing and opening the powder material intake passage; and
- a gaseous medium intake device with an outlet for taking gaseous medium into the powder intake passage with a pressure higher than the second pressure, wherein the outlet of the gaseous medium intake device is located in the powder material intake passage downstream from the first valve and/or the outlet of the gaseous medium intake device is located in the powder material intake passage between the first valve and the outlet of the powder material intake device and/or the first valve is located in the powder material intake passage between the outlet of the gaseous medium intake device and the inlet of the powder material intake device.

The outlet into a liquid tank can also be designated as a "powder material outlet and liquid tank inlet" because the powder material outlet is also the liquid tank inlet. With other words the term "outlet into a liquid tank" is to be understood as being an inlet into a liquid tank which is also the outlet of the powder material intake device. Accordingly the outlet of the powder material intake device (the outlet into a liquid tank) is simultaneously the inlet of the liquid tank. At the powder material intake device outlet the powder material is fed into the liquid being in the liquid tank, because the outlet into the liquid tank is a liquid tank inlet.

The flow direction of the powder material is in the powder material intake passage from the inlet of the powder material intake device to the outlet of the powder material intake device. Accordingly locating the gaseous medium intake device in the powder material intake passage downstream from the first valve is equivalent to the feature that the outlet of the gaseous medium intake device is located in the powder material intake passage between the first valve and the outlet of the powder material intake device and/or the first valve is located in the powder material intake passage between the outlet of the gaseous medium intake device and the inlet of the powder material intake device.

In accordance with the invention the powder material intake device can further comprise a second valve for closing and opening the powder material intake passage. Preferably the second valve is located downstream of the outlet of the gaseous medium intake device and/or the outlet of the gaseous medium intake device is located between the first valve and the second valve and/or the second valve is located between the outlet of the gaseous medium intake device and the outlet of the powder material intake device.

In accordance with the invention the first valve and/or the second valve can be or can comprise an on/off valve.

In accordance with the invention the first valve and/or the second valve can be or can comprise a butterfly valve.

In accordance with the invention the first valve and/or the second valve can be or can comprise a seat valve and/or a single seat valve.

In accordance with the invention the powder material intake passage can comprise at least two sections being connected by connection means such that the powder material intake passage is separable and/or dividable and/or openable for maintenance and cleaning. The sections can be connected by flange connection means and/or clamp connection means and/or hinge connections means as known to the skilled person in the art.

In accordance with the invention the gaseous medium intake device can be or can comprise a gaseous medium intake valve, and/or a positive displacement feeding device, such as for instance a positive displacement pump.

In accordance with the invention there is provided a method for taking powder material into liquid, comprising steps of:
- applying a vacuum or low pressure to the liquid,
- passing powder material into the liquid through a powder material intake passage,
- providing a first valve in the powder material intake passage for closing and opening the powder material intake passage, and
- supplying a pressurized gaseous medium into the powder material intake passage downstream the first valve and/or between the outlet of the powder material intake passage and the first valve at least partially during closing and/or opening the first valve.

In accordance with the invention the method can further comprise the step of providing a second valve in the powder material intake passage for closing and opening the powder material intake passage, wherein the second valve is provided downstream the section of the powder material intake passage where the pressurized gaseous medium is supplied into the powder material intake passage.

In accordance with the invention the method can further comprise the step of closing the first valve, wherein gaseous medium is supplied into the powder material intake passage downstream the first valve at least before the end of closing the first valve, preferably at least after having started closing the first valve and up to closing the first valve and preferred at least from starting closing the first valve until completing closing the first valve.

In accordance with the invention gaseous medium can be supplied into the powder material intake passage downstream the first valve after the first valve has been closed or the first valve is to be opened in order to clean the powder material intake passage from powder material.

In accordance with the invention the method can further comprise the step of closing the second valve, wherein gaseous medium is supplied into the powder material intake passage downstream the first valve after the first valve has been closed and before the second valve is fully closed, preferably before starting closing the second valve in order to clean the second valve and/or the sealing means of the second valve from powder material, wherein the gaseous medium is supplied preferably until the second valve is completely closed.

In accordance with the invention the method can further comprise the step of opening the first valve, wherein gaseous medium is supplied into the powder material intake passage downstream the first valve at least before starting opening the first valve, preferably at least from before starting opening the first valve until the first valve has been opened almost completely, and preferred at least from before starting opening the first valve until completing opening the first valve.

In accordance with the invention the method can further comprise the step of opening the second valve before opening the first valve and opening the first valve after the first valve has at least partly and preferably has been completely opened, wherein gaseous medium is supplied into the powder material intake passage downstream the first valve at least before starting opening the second valve, preferably at least from before starting opening the second valve until the first valve has been opened almost completely, and preferred at least from before starting opening the first valve until completing opening the first valve.

In accordance with the invention the method can be performed with a powder material intake device in accordance with the invention.

In accordance with the invention the powder material can be or comprise food material and/or food grade additives. For instance the powder material can be or can comprise sugar material and/or carbohydrates and/or proteins and/or stabilizers and/or emulsifiers.

BRIEF DESCRIPTION OF THE DRAWINGS

The invention will be explained in further detail with reference to the drawings, wherein the following reference numbers are used:
1 powder intake device
2 powder material intake passage inlet
3 powder material intake passage outlet
4 powder material intake passage
10 second valve
11 closing member
12 axis
20 first valve
21 closing member
22 axis
30 gaseous medium intake device
31 closing member
32 actuating member
33 gaseous medium intake passage
34 outlet of gaseous medium intake device
40 powder gas flow
41 incoming powder gas flow
42 outgoing powder gas flow
43 partly blocked part of powder gas flow
44 passing part of the powder gas flow
45 powder gas flow blocked by closed first valve
46 remainder of powder gas flow to be forced out of the powder material intake passage by gaseous medium flow 50
47 powder gas flow blocked by closed first valve
50 gaseous medium flow
51 gaseous medium flow
60 line indicating possible separation of powder material intake passage in two sections for maintenance and/or cleaning A preferred embodiment of the invention is shown in the attached drawings:

FIG. 5 is a schematic view of the powder intake device of FIG. 1 in a closed position before the powder intake flow is established.

FIG. 6 is a schematic view of the powder intake device of FIG. 1 showing a first step of establishing the powder intake flow.

FIG. 7 is a schematic view of the powder intake device of FIG. 1 showing a second step of establishing the powder intake flow.

FIG. 8 is a schematic view of the powder intake device of FIG. 1 in an open position after the powder intake flow has been established.

DETAILED DESCRIPTION

Figure 1:
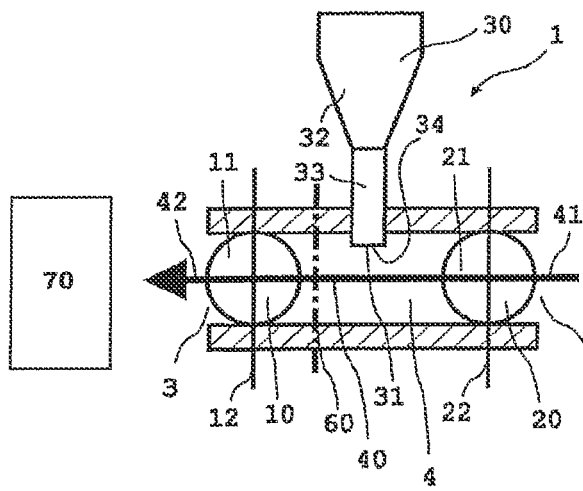
FIG. 1 is a schematic view of a powder intake device in accordance with an embodiment of the invention in an open position before the powder flow is to be shut down.
Figure 2:
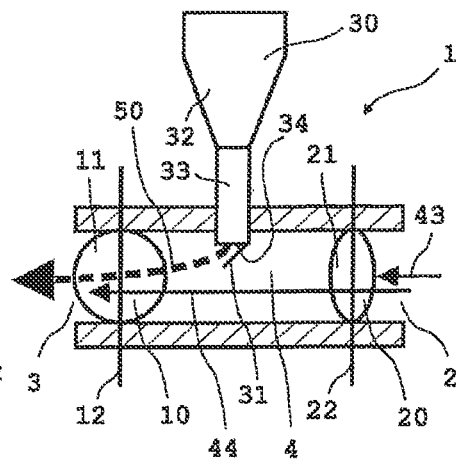
FIG. 2 is a schematic view of the powder intake device of FIG. 1 showing a first step of shutting down the powder intake.

FIG. 1 shows the preferred embodiment of the invention. The powder intake device has the general reference number 1 and comprises a powder material intake passage inlet 2, a powder material intake passage outlet 3 and a powder material intake passage 4 extending from the powder material intake passage inlet 2 to the powder material intake passage outlet 3.

There is a process tank (not shown) filled with liquid into which the powder material is to be taken. In the pressure tank there is provided low pressure or vacuum above the surface of the liquid in a manner known to the skilled person.

The powder material will be provided to the powder material intake device inlet 2 of the powder material intake device 1 in a manner known to the skilled person.

In the powder material intake passage 4 there is provided a first valve 20 having a closing member 21 and an axis 22 around which the closing member 21 is turned for opening and closing the powder material intake passage 4.

In the embodiment as shown the first valve 20 is a butterfly valve. However any other suitable valve can be used. For instance a single-seat valve can be used instead. Other options are ball vales, diaphragm valves, gate valves and/or pinch valves.

There is a gaseous medium intake device 30 located downstream from the first valve 20 in the powder material intake passage 4. The gaseous medium intake device 30 comprises a closing member 31 for providing and blocking a flow of gaseous medium into the powder material intake passage 4. Furthermore there is an actuating member 32 (for instance a drop member or any other suitable means) and a gaseous medium intake passage 33 extending from a gaseous medium reservoir (not shown) or from the ambient atmosphere (air or nitrogen, etc.) to the outlet 34 of the gaseous medium intake device 30.

There is also a second valve 10 provided in the powder material intake passage 4 located downstream from the outlet 34 of the gaseous medium intake device 30.

The second valve 10 can be similar to the first valve 20 or can be of another suitable valve type, for instance as mentioned above with respect to the first valve 10, and comprises a closing member 11 and an axis 12 around which the closing member 11 is turned for opening and closing the powder material intake passage. However it is clear that the first and the second valve can be different.

Alternative valves may be used for the first valve 20 and/or the second valve 10, for instance valves wherein the closing member is displaced (for instance pushed and pulled and/or pushed against a resilient member) along axis 22 for opening and closing the powder intake passage 4.

In accordance with the invention the second valve 10 may be omitted. Such embodiments would comprise the first valve (first has only been added in order to distinguish this "first" valve from the "second" valve for the embodiments where at least two valves are provided) and the gaseous medium intake device located downstream thereof in the powder material intake passage. For this embodiment it is preferred to maintain the gaseous medium flow into the process tank all the time after closing the first valve until reopening the first valve.

Line 60 indicates a possible position, where the powder material intake passage 4 may be embodied separable into two sections for maintenance and/or cleaning. The sections can be connectable by means known to the skilled person, such as using flange connection means and/or clamping means.

FIGS. 1 to 4 are showing the preferred mode of closing the powder material intake passage 4 of the powder material intake device 1.

FIG. 1 shows the fully open powder material intake passage 4. The gaseous medium intake device 30 is closed. There is a powder gas flow 40 from the inlet 2 to the outlet 4 of the powder material intake passage 4 having an incoming powder gas flow 41 from a powder reservoir (not shown) and an outgoing powder gas flow 42 into a process tank 70 housing the liquid the powder is to be taken into.

For closing the powder material intake passage 4 of the powder material intake device 1 the gaseous medium intake device is opened such that a gaseous medium flow 50 into the liquid of the process tank is established and the first valve 20 will starting to get closed. Thereby the powder gas flow will be blocked partly such that there is blocked part 43 of the powder gas flow and a passing part 44 of the powder gas flow.

Figure 3:
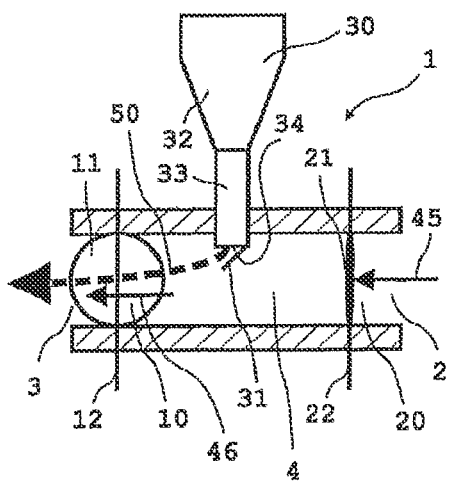
FIG. 3 is a schematic view of the powder intake device of FIG. 1 showing a second step of shutting down the powder intake.

FIG. 3 shows the condition wherein the first valve 20 is fully closed. The gaseous medium flow 50 has prevented wet powder material or liquid to backflow into the powder material intake passage 4 and to affect the sealing functionality of the first valve 20. There is the powder gas flow 45 being blocked by closed first valve 20. The remainder 46 of the powder gas flow is forced out of the powder material intake passage 4 by the gaseous medium flow 50 thereby cleaning the second valve 10.

Figure 4:
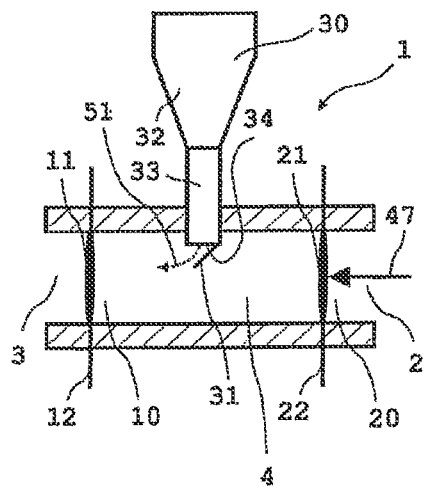
FIG. 4 is a schematic view of the powder intake device of FIG. 1 in a closed position after the powder intake has shut down.

Next the second valve 10 is closed. This condition is shown in FIG. 4. The powder gas flow 47 is blocked by the closed first valve 20. The liquid and wet powder material is blocked by the closed second valve 10. The gaseous medium flow 51 will be less because of the pressure building up in between the two closed valves 20, and 10.

FIGS. 5 to 8 are showing the preferred mode of opening the powder material intake passage 4 of the powder material intake device 1.

FIG. 5 shows the fully closed powder material intake device 1, i.e. both valves 10 and 20 are closed. The gaseous medium intake device may be opened. If it is closed it has be opened to build up a pressure in the room of the powder material intake passage 4 between the valves 10 and 20.

Next, as shown in FIG. 6 the second valve 10 is opened. Because of the pressure in the room between the valves 10 and 20 and the open gaseous medium intake device almost instantaneously the gas medium flow 50 is established ba opening second valve 10.

Next, as shown in FIG. 7, the first valve 20 will be opened. There is a blocked part 43 of the powder gas flow and a passing part 44 of the powder gas flow.

Finally, as shown in FIG. 8, both valves are fully open and the powder gas flow 40 has been build up.

What is claimed is:

1. A hygienic powder material intake device for taking a food powder material into a liquid, the device having a hygienic design for Cleaning-in-Place cleaning and comprising:
    an inlet to which fluidized powder is supplied with a first pressure;
    an outlet directly leading into a liquid tank having a second pressure less than the first pressure at the inlet;
    a horizontal powder material intake passage from the inlet to the outlet;
    a first valve including a closing member located inside the powder material intake passage for closing and opening the powder material intake passage;
    a second valve for closing and opening the powder material intake passage; and
    a gaseous medium intake device with an outlet for taking a gaseous medium into the powder intake passage with a pressure higher than the second pressure, wherein the outlet of the gaseous medium intake device is located in the powder material intake passage downstream from the first valve,
    wherein the first and the second valves extend from one end of an inner wall of the powder material intake passage to another end of the inner wall of the powder material intake passage,
    wherein the pressure after the second valve is always lower than the pressure before the second valve, and
    wherein the device is configured to transfer the food powder material out of the device when both the first and second valves are simultaneously opened.

2. The powder material intake device according to claim 1, wherein the second valve is located downstream of the outlet of the gaseous medium intake device and/or the outlet of the gaseous medium intake device is located between the first valve and the second valve and/or the second valve is located between the outlet of the gaseous medium intake device and the outlet of the powder material intake device.

3. The powder intake device according to claim 1, wherein the first valve and/or the second valve comprises an on/off valve and/or a seat valve and/or a single seat valve.

4. The powder intake device according to claim 1, wherein powder material intake passage comprises at least two sections being connected by connecting means such that the powder material intake passage is separable and/or dividable and/or openable for maintenance and cleaning.

5. The powder intake device according to claim 1, wherein the gaseous medium intake device comprises a gaseous medium intake valve, and/or a positive displacement feeding device.

6. The device according to claim 1, wherein the closing member is configured to turn around an axis perpendicular to the axial direction of the powder material intake passage for closing and opening the powder material intake passage.

7. The device according to claim 1, wherein the gaseous medium intake device includes a second closing member in the powder material intake passage downstream from the first valve.

8. The device according to claim 1, including valves selected from the first valve, the second valve and the gaseous medium intake device.

9. A hygienic method for taking a food powder material into a liquid, the method being employed on a device hygienically designed for Cleaning-in-Place cleaning, the method comprising the steps of:
    applying a vacuum or low pressure to the liquid;
    passing the food powder material directly into the liquid through a horizontal powder material intake passage;
    providing a first valve including a closing member located inside the powder material intake passage for closing and opening the powder material intake passage;
    providing a second valve located inside the powder material intake passage for closing and opening the powder material intake passage; and supplying a pressurized gaseous medium into the powder material intake passage downstream of the first valve and/or between the outlet of the powder material intake passage and the first valve at least partially during closing and/or opening the first valve, wherein the first and the second valves extend from one end of an inner wall of the powder material intake passage to another end of the inner wall of the powder material intake passage, wherein the pressure after the second valve is always lower than the pressure before the second valve, and wherein the food powder material is transferred out of the device when both the first and second valves are simultaneously opened.

10. The method according to claim 9, wherein the second valve is provided downstream the section of the powder material intake passage where the pressurized gaseous medium is supplied into the powder material intake passage.

11. The method according to claim 10, further comprising:

closing the second valve, wherein the gaseous medium is supplied into the powder material intake passage downstream the first valve after the first valve has been closed and before the second valve is fully closed, before starting closing the second valve in order to clean the second valve and/or the sealing means of the second valve from powder material, wherein the gaseous medium is supplied until the second valve is completely closed.

12. The method according to claim 10, further comprising opening the second valve before opening the first valve and opening the first valve after the first valve has at least partly opened, wherein the gaseous medium is supplied into the powder material intake passage downstream the first valve at least before starting opening the second valve, at least from before starting opening the second valve until the first valve has been opened almost completely, and at least from before starting opening the first valve until completing opening the first valve.

13. The method according to claim 9, performed with a powder material intake device for taking a powder material into a liquid comprising:

an inlet to which fluidized powder is supplied with a first pressure;

an outlet directly leading into a liquid tank having a second pressure less than the first pressure at the inlet;

the powder material intake passage from the inlet to the outlet;

the first valve for closing and opening the powder material intake passage; and a gaseous medium intake device with an outlet for taking a gaseous medium into the powder intake passage with a pressure higher than the second pressure, wherein the outlet of the gaseous medium intake device is located in the powder material intake passage downstream from the first valve.

14. The method according to claim 13, wherein the gaseous medium intake device includes a second closing member in the powder material intake passage downstream from the first valve.

15. The method according to claim 9, further comprising:

closing the first valve, wherein the gaseous medium is supplied into the powder material intake passage downstream the first valve at least before the end of closing the first valve, at least after having started closing the first valve and up to closing the first valve and at least from starting closing the first valve until completing closing the first valve.

16. The method according to claim 9, wherein the gaseous medium is supplied into the powder material intake passage downstream the first valve after the first valve has been closed or the first valve is to be opened in order to clean the powder material intake passage from powder material.

17. The method according to claim 9, further comprising:

opening the first valve, wherein the gaseous medium is supplied into the powder material intake passage downstream the first valve at least before starting opening the first valve, at least from before starting opening the first valve until the first valve has been opened almost completely, and from before starting opening the first valve until completing opening the first valve.

18. The method according to claim 9, wherein the closing member is configured to turn around an axis perpendicular to the axial direction of the powder material intake passage for closing and opening the powder material intake passage.

19. The method according to claim 9, including valves selected from the first valve, the second valve and a gaseous medium intake device.

* * * * *